Figure 1:
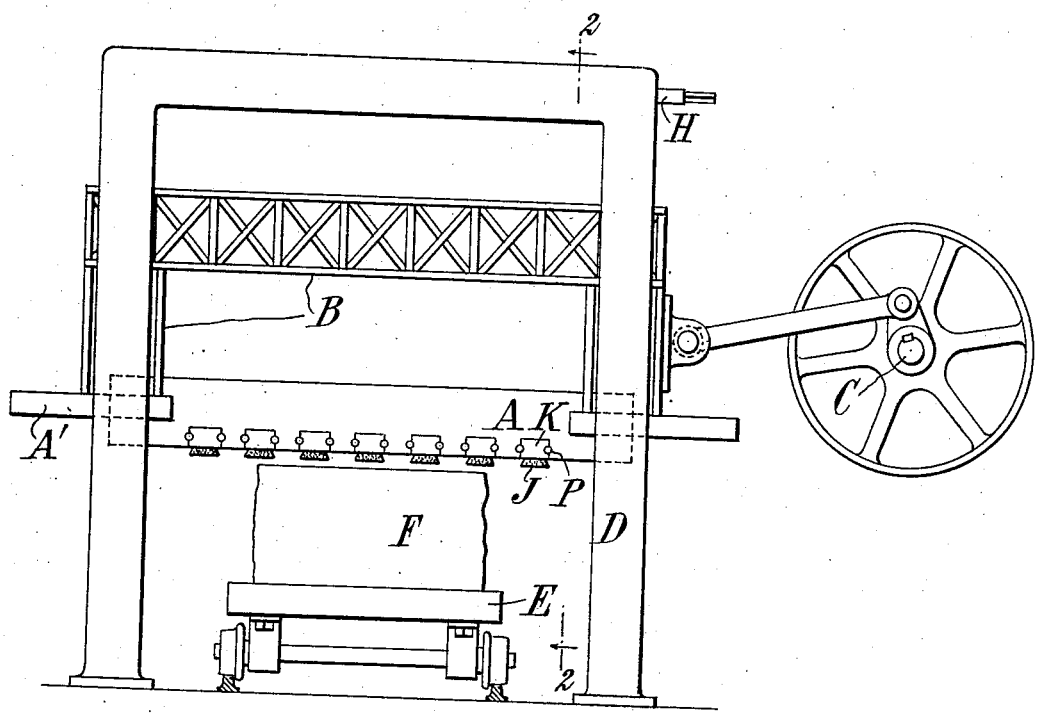

No. 894,046.　　　　　　　　　　　　　　PATENTED JULY 21, 1908.
J. R. PEIRCE.
MARBLE SAWING MACHINE.
APPLICATION FILED DEC. 11, 1906.

2 SHEETS—SHEET 1.

WITNESSES:

INVENTOR:
John Royden Peirce,
By Attorneys,

No. 894,046.

PATENTED JULY 21, 1908.

J. R. PEIRCE.
MARBLE SAWING MACHINE.
APPLICATION FILED DEC. 11, 1906.

2 SHEETS—SHEET 2.

WITNESSES:
Fred White
René Bruine

INVENTOR :
John Hoyden Peirce,
By Attorneys.

UNITED STATES PATENT OFFICE.

JOHN ROYDEN PEIRCE, OF NEW YORK, N. Y., ASSIGNOR TO ROYDEN MARBLE MACHINERY COMPANY, OF NEW YORK, N. Y., A CORPORATION OF NEW JERSEY.

MARBLE-SAWING MACHINE.

No. 894,046.  Specification of Letters Patent.  Patented July 21, 1908.

Application filed December 11, 1906. Serial No. 347,326.

*To all whom it may concern:*

Be it known that I, JOHN ROYDEN PEIRCE, a citizen of the United States, residing in the borough of Manhattan, city, county, and State of New York, have invented certain new and useful Improvements in Marble-Sawing Machines, of which the following is a specification.

In my application for patent for improvements in coping machines, filed October 31, 1904, Serial No. 230,863, and in subsequent applications, I have described apparatus for coping marble, that is to say, for dividing large slabs into smaller and regular plates for facing walls and similar work by means of a rapidly rotating disk or thin wheel or carborundum which passes through the stone in the manner of a circular saw through wood. In the art as practiced heretofore, the slabs from which coping plates are cut are obtained from large blocks, quarried four and five feet in width and thickness, and about six feet long. For dividing these blocks into slabs, it is customary to use large steel or diamond saws which are slow and expensive.

I propose to adapt carborundum or equivalent agglomerated cutting material to this purpose by providing a saw with a steel or other metal back, and with an edge of carborundum particles agglomerated with a hard bond, preferably a vitrified bond. And in order to make a good connection with the carborundum edge, the metal is preferably fastened along a side face of the carborundum, and preferably overlying both of the outer side faces thereof. The especial advantage of this method of attachment, is that the carborundum edge may be made substantially continuous for any desired length, and the wear of the carborundum may be thus retarded. My experiments have shown that the vitrified bond gives a much more durable edge, and an edge which is in fact a true saw edge, whereas softer bonds allow the carborundum to wear away so rapidly that the action is substantially like that of the old steel saws to which sand and water were continuously fed. The vitrified bond makes a more brittle product, and it is only by extensive experimentation that I have found a satisfactory method of fastening the carborundum to the steel back. The method described does not strain the brittle and therefore unreliable edges of the carborundum sections, the points at which the attachment takes place being preferably entirely within the edges of the carborundum blocks.

Other advantages are referred to in detail hereinafter.

The accompanying drawings illustrate embodiments of the invention.

Figure 2:
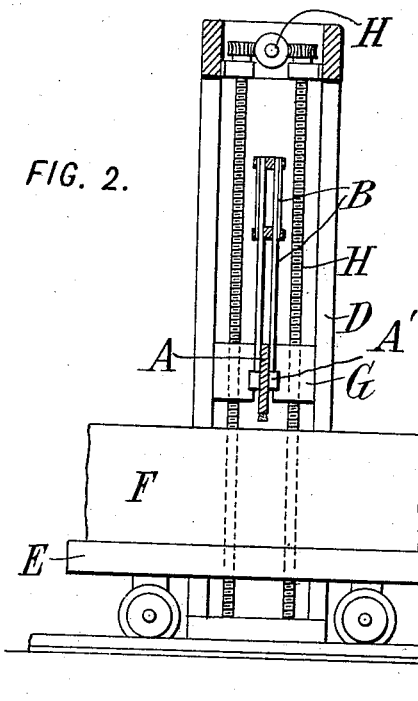
Figure 10:
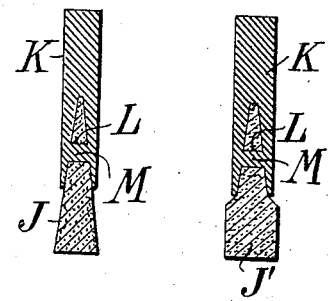
Figure 7:
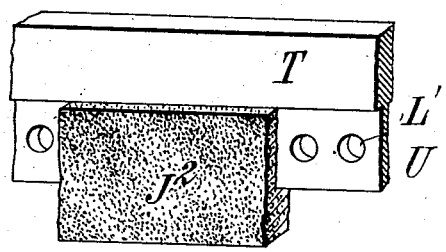
Figure 8:
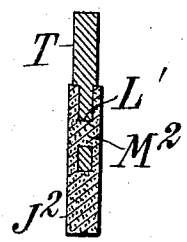
Figure 9:
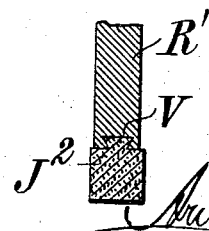

Figure 1 is a side elevation, and Fig. 2 an end elevation of a sawing machine; Figs. 3 and 4, 5 and 6, and 7 and 8, are respectively perspectives and cross-sections of portions of different saw blades embodying the invention; Fig. 9 is a cross-section of still another type of blade. Fig. 10 is a cross-section of another type.

Referring to the apparatus illustrated, the saw blade, which is indicated as a whole at A, is of the reciprocating type, being carried in a frame B which receives reciprocating motion from a shaft C, and which is vertically adjustable between the fixed standards D on opposite sides of a track upon which a car E rolls carrying the block of marble F which is to be sawed. The saw carries slides A' which slide between blocks G (Fig. 2) which move up and down between the fixed standards D, the downward movement being regulated by means of threaded shafts H, the downward feed of course being made commensurate with the rapidity with which the saw cuts through the block. Instead of the reciprocating saw shown, the invention may be used in connection with a circular saw, or with any other suitable type of machine, the improvement lying in the saw blade.

The saw blade is composed of a back of steel or other metal, and its edge is formed of carborundum or similar agglomerated crystalline material, the edge being either continuous or in a succession of longitudinally spaced teeth.

Figure 3:
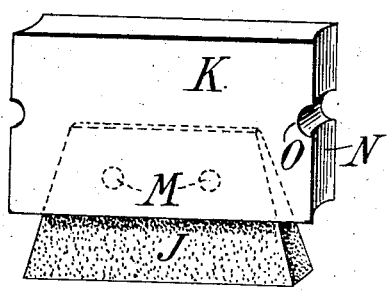
Figure 4:
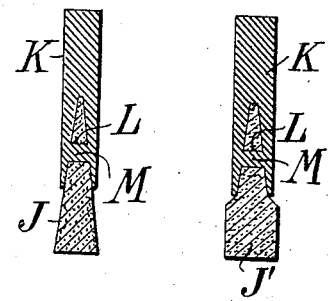

Figs. 1, 3 and 4 illustrate a construction designed especially for separated teeth.

In the construction of Fig. 3, a carborundum tooth J of the simplest shape is made with a vitrified bond. Such a tooth may be made of various sizes. A practical size giving sufficient strength and wearing qualities, is 2 inches and one-quarter by an inch and a half wide and a quarter of an inch thick on the outer edge. The tooth when vitrified tends to distort slightly, and therefore it is important to use a simple shape with as few sharp edges as possible, and with a fastening which shall not depend upon the design of the carborundum tooth. For this purpose the cutting edge of the tooth is plain, and the desired fastening of the metal back upon the side faces and the end faces of the carborundum tooth is accomplished by tapering both the longitudinal or side faces and the end faces back from the cutting edge, making a figure with plain faces with five or six sides according as the upper edge is made sharp or somewhat flat as shown, and with all the exposed angles blunt (approximately equal to or slightly less than a right angle). Upon this carborundum tooth a holder may be provided, such for example as the steel block K cast upon the rear portion of the tooth J and adhering with great firmness to the tooth. The block K will be of a thickness slightly less than that of the edge of the tooth J. Additional means for fixing the tooth firmly in the block are provided by forming holes L in the central portion of the tooth, and as far removed from the edges as possible, so that when the block K is cast upon the tooth, the metal runs also through the holes L and forms studs M integral with the metal holder, and preventing absolutely any removal of the tooth without breaking it; and the tooth will be made of such size that it cannot be broken under the strains occurring in use.

The block K may be fastened to the back of the blade at desired intervals by any known or suitable arrangement, as for example by forming grooved edges N fitting complementary convex edges of the backing blade, and by means of half-round openings O registering with correspondingly shaped openings in the backing member, so that pins P (Fig. 1) may be used to hold the block in place.

Figure 5:
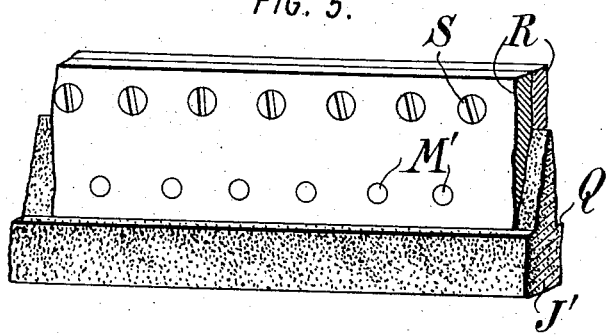
Figure 6:
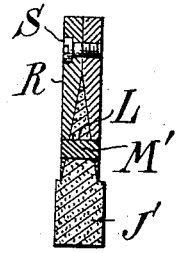

The carborundum edge instead of being in the form of separate teeth J with beveled end faces, may be continuous as at J' in Fig. 5. In either case the plainness of the side faces of the teeth J may be departed from sufficiently to secure side faces which for a certain distance back from the cutting edge are perpendicular thereto, and are then tapered off either with or without shoulders Q (Fig. 5). The steel back may also be varied with either type of carborundum edge. Instead of a cast block similar to K or a continuous cast backing, the corresponding part may be made up of a pair of plates R (Fig. 5) shaped to embrace the tapering portion of the carborundum, and fastened to each other at a point in the rear of the carborundum by means of screws S or the like. With this construction, separately formed studs M' of steel, lead, cement or the like, may be passed through the steel and the holes L in the carborundum.

While the constructions described are thought to be the best for the utilization of a carborundum edge with vitrified bond, it will be appreciated that there are numerous other constructions utilizing one or other of the features of improvement embraced by the invention. For example the idea of fastening the metal along a vertical longitudinal face of the carborundum and uniting the two by means of studs located entirely within the edges of the carborundum, is illustrated in Figs. 7 and 8 by a metal back T having a thin portion U about which the carborundum edge $J^2$ is cast or molded, the carborundum passing in the form of studs $M^2$ through holes L' in the portion U of the steel backing. This construction may be used with a bond of magnesium or any other material which does not have to be vitrified at a temperature which would soften or distort the steel. The portion U of the steel back may be indented, corrugated, or otherwise roughened, as may also be the contacting faces of the steel and carborundum in the previously described constructions, although with the natural roughness of the vitrified material any artificial roughening would seem to be unnecessary.

The shape of the portion which enters the cast block K of Fig. 3, or which enters between the plates R of Fig. 5, may be varied from the particular shape shown in those figures. For example it may be in the form of a dovetailed tongue V (Fig. 9) entering a corresponding groove in the plate R' constituting the backing for the continuous or toothed carborundum edge $J^2$.

The construction shown in Fig. 4 may be modified as in Fig. 10 by running the edge portion J' of greater width than the steel backing up or nearly to the edge of the steel.

An important feature of the invention is the embedding of the carborundum in or upon the metal backing, whether in the shapes or dimensions of carborundum pieces shown, or in any other shapes or dimensions.

The vitrified bond herein referred to is not to be confused with a bond of mere baked clay, giving a cutting edge about as hard as an ordinary building brick. It is rather a bond which is truly vitrified and which therefore calls for a temperature higher than the melting point of steel, so that the cutting edge of carborundum cannot be molded on the steel blade and then vitrified.

Though I have described with great particularity of detail certain specific embodiments of the invention, yet it is not to be understood therefrom that the invention is restricted to the specific constructions described. Various modifications thereof in detail, and in the arrangement and combination of the parts, may be made by those skilled in the art, without departure from the invention.

What I claim is:—

1. A saw for marble or similar stone having a metal back and having an edge of carborundum agglomerated with a hard bond, the metal being fastened along a side face of the carborundum by means of studs passing through the carborundum and located entirely within the edges of the carborundum.

2. A saw for marble or similar stone having a metal back and having an edge of carborundum, the carborundum being in the form of teeth each of which is narrower and shorter at its rear than at its cutting edge, and said narrower, shorter portion being embraced both at the sides and at the ends by the metal back.

3. A saw for marble or similar stone having a metal back and having an edge of carborundum, the edge being composed of teeth J which are narrower and shorter at their rear than at their cutting edge, and blocks K of metal cast about said narrower, shorter portion of the teeth, and said teeth J having openings L in which the cast metal forms studs M entirely within the edges of the carborundum tooth.

In witness whereof, I have hereunto signed my name in the presence of two subscribing witnesses.

JOHN ROYDEN PEIRCE.

Witnesses:
   DOMINGO A. USINA,
   THEODORE T. SNELL.